Sept. 20, 1949.  R. G. LE TOURNEAU  2,482,588
VOLTAGE REGULATOR
Filed Feb. 11, 1947
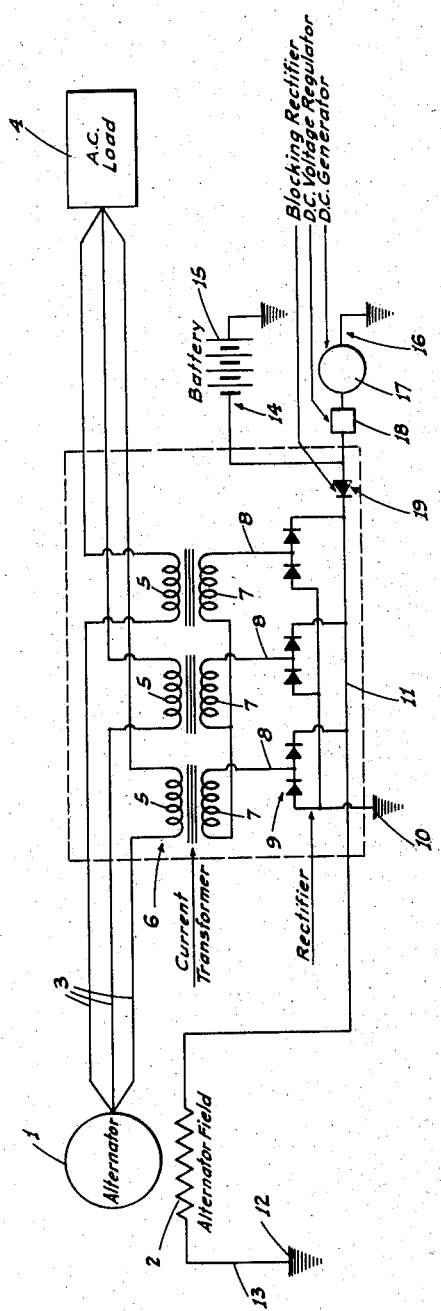
INVENTOR.
R. G. LeTourneau
BY
 ATTYS Patented Sept. 20, 1949

2,482,588

UNITED STATES PATENT OFFICE 2,482,588

VOLTAGE REGULATOR

Robert G. Le Tourneau, Longview, Tex., assignor to R. G. Le Tourneau, Inc., Stockton, Calif., a corporation of California Application February 11, 1947, Serial No. 727,805

4 Claims. (Cl. 322—27)

The present invention relates to, and it is an object to provide, a novel voltage regulator for A. C. alternators or generators; the invention contemplating an electrical system whereby excitation of the A. C. generator is positively and automatically effected in direct proportion to the load.

Another object of the invention is to provide a voltage (exciter current) regulating system for A. C. generators, which comprises a current transformer having its primary interposed in series in the load circuit between the A. C. generator and the load; the potential of such transformer as induced—in proportion to the load—in the secondary of the transformer being carried through an A. C.-D. C. rectifier and then fed as a D. C. exciter current to the field of the A. C. generator.

Thus, the exciter current delivered to the A. C. generator is constantly maintained in correct and necessary proportion to the load current; increase or decrease in the load causing automatic and corresponding variation in such excitation current. In other words, the system automatically compensates for alternator regulation.

It is also an object of the invention to provide a voltage regulating system which prevents overloading of the A. C. generator.

A further object of the invention is to provide a voltage regulating system, for the purpose described, which is especially useful on tractor propelled implements wherein a tractor engine driven A. C. generator is employed as the current source for an electric actuating motor of the implement. In such an installation, wherein the A. C. generator is not only subject to widely varying load, but also to speed changes occasioned by the tractor engine accelerating and decelerating, the described regulating system is of great advantage.

A further object of the invention is to provide a practical voltage regulator, and one which will be practical for the purpose for which it is designed.

These objects are accomplished by means of such structure and relative arrangement of parts as will fully appear by a perusal of the following specification and claims.

The figure of the drawing is a diagrammatic view of one form of circuit which the system may employ.

Referring now more particularly to the characters of reference on the drawings, the circuit which is here shown to illustrate the system includes an A. C. alternator or generator, indicated at 1, which generator includes an alternator field 2.

The load circuit is three-phase and is numbered 3; such load circuit leading to connection with a source of A. C. load, indicated diagrammatically at 4.

When the described voltage regulating system is employed on a tractor propelled implement, the A. C. generator 1 is mounted on the tractor and driven by the tractor engine, thus being subject to acceleration and deceleration with the latter. In such an installation the A. C. load 4 would be, for example, an electric motor on the implement arranged in actuating relation to a movable part of the latter.

The load circuit 3 has the corresponding primary coils 5, of a current transformer 6, interposed in series therein. The secondary coils of such current transformer 6 are indicated at 7.

The output leads 8 of the secondary coils 7 extend to and connect with a rectifier 9, preferably of dry plate type; one side of the rectifier being grounded, as at 10. The other side of the rectifier 9 connects, by a lead 11, to one terminal of the alternator field 2 of the A. C. generator 1; the opposite terminal of said field 2 being grounded, as at 12, by a lead 13.

Initial exciter current for the field 2 of the generator 1 is fed to the lead 11 from a battery circuit 14, including a battery 15, or a generator circuit 16 including a D. C. generator 17 and a D. C. voltage regulator 18. In a tractor propelled implement the battery circuit and the generator circuit could be the conventional ones included in the tractor.

Thus, under no load conditions the open circuit voltage of the A. C. generator is controlled by field excitation supplied by any one of the usual means, such as the described battery circuit 14 or generator circuit 16.

Upon a load being imposed on the circuit 3, the load current passing through the series-connected primary coils 5 of the current transformer 6 induces a potential in the secondary coils 7 in direct proportion to the A. C. load 4.

This potential as induced in such secondary coils 7 is fed directly through the rectifier 9, and from said rectifier delivers to the lead 11 and thence to the field 2. While the battery circuit 14 or the generator circuit 16 furnishes initial excitation current, once the circuit is in operation the excitation is effected from the rectifier 9 in direct and correct proportional amount to the load.

A blocking rectifier 19 is interposed in the lead 11 between the rectifier and the junction of the battery circuit 14 and generator circuit 16; this blocking rectifier preventing back feeding from the main rectifier 9 into said battery circuit or generator circuit, which would be undesirable.

It will be seen that with the described voltage regulating system, the exciter current delivered to the field 2 is automatically and positively maintained, regardless of variation in the A. C. load 4, or speed fluctuation of the A. C. generator 1; this being accomplished in short by excitation of the field 2 by a rectified current induced from the load circuit of the A. C. generator, and in proportion to the load imposed thereon.

From the foregoing description it will be seen that there has been produced such a voltage regulating system as substantially fulfills the objects of the invention as set forth herein.

While this specification sets forth in detail the present and preferred construction of the voltage regulating system, still in practice such deviations from such detail may be resorted to as do not form a departure from the spirit of the invention, as described in the appended claims.

Having thus described the invention, the following is claimed as new and useful and upon which Letters Patent are desired:

1. A voltage regulating system for an A. C. generator having a field, the output of the A. C. generator being coupled to a load circuit; said system comprising means to induce an A. C. potential from the load circuit in direct proportion to the load, means to rectify said A. C. potential to a D. C. exciter current, and circuit means to feed such exciter current directly to the field of the A. C. generator; there being an independent source of initial D. C. exciter current, separate from said load circuit, connected to said circuit means, and a blocking rectifier between said independent source of initial exciter current and said circuit means.

2. A voltage regulating system for an A. C. generator, having a field, the output of the A. C. generator being coupled to a load circuit, said system comprising an A. C.-D. C. rectifier, a current transformer having its primary in series with the load circuit and its secondary connected to the A. C. input side of the rectifier, and circuit means connecting the D. C. output side of the rectifier directly to the field of the A. C. generator whereby to deliver D. C. exciter current to said field in direct proportion to the load in the load circuit; there being an independent source of initial D. C. exciter current, separate from said load circuit, connected to said circuit means, and a blocking rectifier interposed between said circuit means and independent source of initial D. C. exciter current.

3. A voltage regulating system for an A. C. generator, having a field, the output of the A. C. generator being coupled to a load circuit, said system comprising an A. C.-D. C. rectifier, a current transformer having its primary in series with the load circuit and its secondary connected to the A. C. input side of the rectifier, and circuit means connecting the D. C. output side of the rectifier directly to the field of the A. C. generator whereby to deliver D. C. exciter current to said field in direct proportion to the load in the load circuit; there being two independent sources of initial D. C. exciter current; said sources being separate from the load circuit, one source being a battery including a battery circuit, and the other source a D. C. generator including a generator circuit, the battery circuit and the generator circuit being in parallel and connected to said circuit means, and a blocking rectifier interposed between said circuit means and the parallel battery and generator circuits to prevent the rectifier output from feeding back through said last named circuits.

4. A voltage regulating system for an A. C. generator, having a field, the output of the A. C. generator being coupled to a load circuit, said system comprising an A. C.-D. C. rectifier, a current transformer having its primary in series with the load circuit and its secondary connected to the A. C. input side of the rectifier, and circuit means connecting the D. C. output side of the rectifier directly to the field of the A. C. generator whereby to deliver D. C. exciter current to said field in direct proportion to the load in the load circuit; there being an independent source of initial D. C. exciter current, separate from said load circuit, connected to said circuit means, and current blocking means interposed between said circuit means and independent source of initial D. C. exciter current operative to prevent current feed back to said separate source from said circuit means.

ROBERT G. LE TOURNEAU.

REFERENCES CITED

The following references are of record in the file of this patent:

UNITED STATES PATENTS

| Number | Name | Date |
| --- | --- | --- |
| 787,027 | Dobrowolsky | Apr. 11, 1905 |
| 2,066,919 | West | Jan. 5, 1937 |